US010203039B1

(12) United States Patent
Bretz et al.

(10) Patent No.: US 10,203,039 B1
(45) Date of Patent: Feb. 12, 2019

(54) BITE VALVE WITH HOLLOW VALVE CORE

(71) Applicant: Westlife Express, LLC, Gardena, CA (US)

(72) Inventors: Michael Bretz, Redondo Beach, CA (US); Michael Akira West, Manhattan Beach, CA (US)

(73) Assignee: Westlife Express, LLC, Gardena, CA (US)

( * ) Notice: Subject to any disclaimer, the term of this patent is extended or adjusted under 35 U.S.C. 154(b) by 0 days.

(21) Appl. No.: 15/838,913

(22) Filed: Dec. 12, 2017

(51) Int. Cl.
*F16K 15/14* (2006.01)
*A45F 3/04* (2006.01)
*A45F 3/20* (2006.01)
*B65D 47/06* (2006.01)

(52) U.S. Cl.
CPC .............. *F16K 15/147* (2013.01); *A45F 3/04* (2013.01); *A45F 3/20* (2013.01); *B65D 47/06* (2013.01); *B67D 2210/00131* (2013.01)

(58) Field of Classification Search
CPC . F16K 15/147; A45F 3/20; A45F 3/04; B67D 2210/00131; B65D 47/04; B65D 47/06; B65D 47/2018
USPC ......... 251/342, 349; 220/703, 714; 222/207, 222/209, 175; 224/148.2
See application file for complete search history.

(56) References Cited

U.S. PATENT DOCUMENTS

| 5,601,207 | A | * | 2/1997 | Paczonay | A47G 21/185 220/703 |
| 5,816,457 | A | * | 10/1998 | Croft | A45F 3/04 224/148.2 |
| 6,039,305 | A | | 3/2000 | Hoskins et al. | |
| 6,764,064 | B2 | * | 7/2004 | Sturm | A45F 3/20 222/175 |
| 7,703,633 | B2 | * | 4/2010 | Chen | B65D 47/2062 220/703 |
| 8,152,138 | B2 | * | 4/2012 | Skillern | A45F 3/16 251/342 |
| 8,408,425 | B2 | * | 4/2013 | Lien | A45F 3/20 222/105 |

* cited by examiner

*Primary Examiner* — John Bastianelli
(74) *Attorney, Agent, or Firm* — Stetina Brunda Garred and Brucker

(57) ABSTRACT

A bite valve for controlling fluid flow from a fluid source includes a sleeve and a hollow valve core. The sleeve includes an outlet end and an opposite, a sleeve outer surface and an opposing sleeve inner surface, and an outlet lip. The core includes a core body including distal and inlet ends. The core includes an inlet defining a flow channel. The core includes a core central chamber and the flow channel extending to the central chamber. The core includes an annular chamber formed about the core body within the sleeve inner surface. The core includes flow ports disposed radially about the core body. The core includes an outer rim that is cooperatively sized and configured with the outlet lip with the outer rim in sealing engagement with the outlet lip and out of sealing engagement when the sleeve deformed towards the core body for discharging fluid flow.

16 Claims, 3 Drawing Sheets

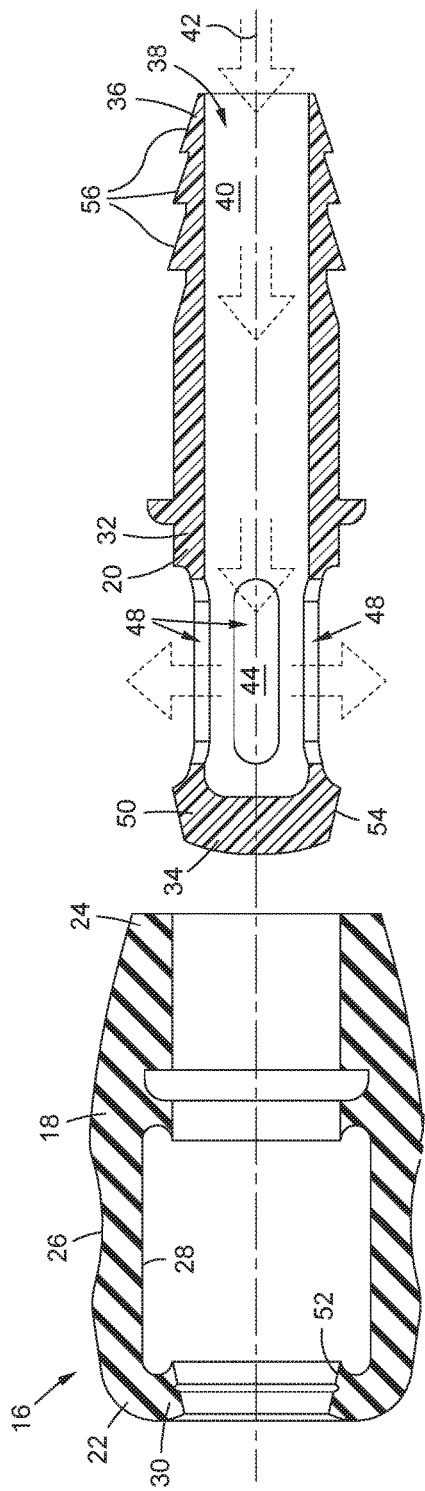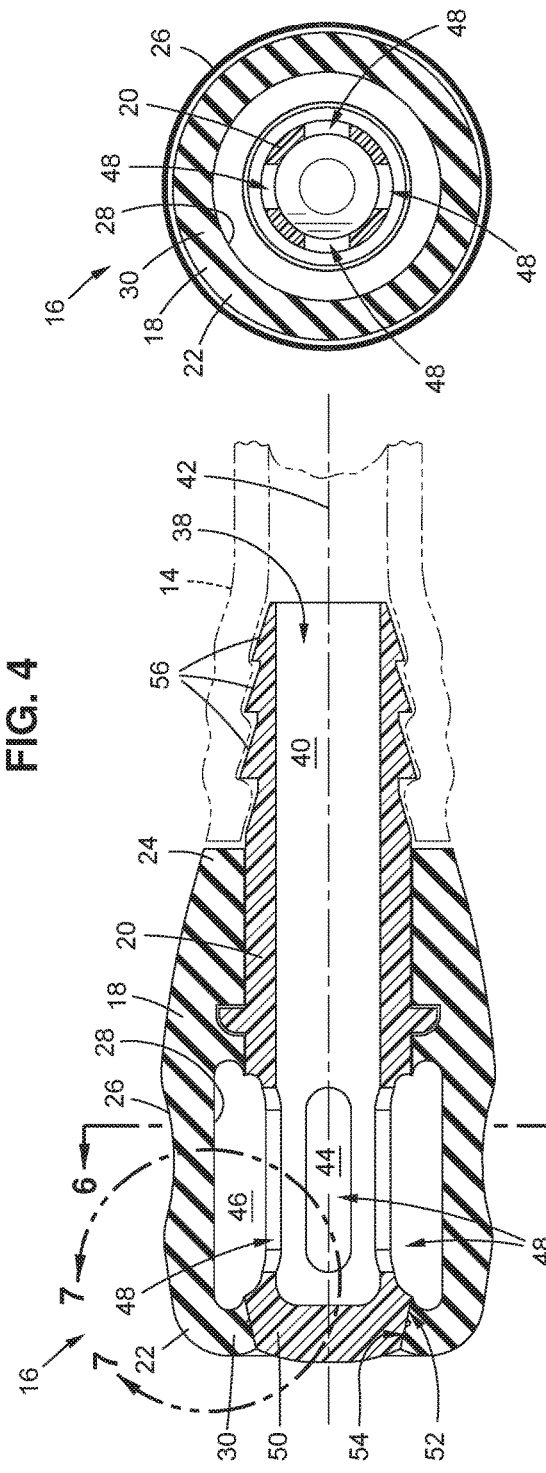

BITE VALVE WITH HOLLOW VALVE CORE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to fluid valves. More particularly, the present disclosure relates to a bite valve having a hollow valve core for use with a fluid reservoir.

2. Related Art

Hydration packs for use during physical activity, such as hiking, snowboarding, cycling, and so forth, typically include a fluid reservoir or bladder worn by the user. A fluid tube is connected to the fluid reservoir and terminates in a bite valve. Bite valves are used to provide users with ready access to hands-free hydration. A bite valve includes a flexible seal that when bitten by the user the seal is broken to allow fluid flow.

The amount of liquid from a hydration pack may vary based upon the user's needs or desires. To the extent that a relatively low amount is required, the hydration pack may utilize a bite valve and connected fluid tube may feature reduced overall sizing and weight. With regard to the fluid tube, a reduction of the tube inner and outer diameters is readily accomplished. However, merely reducing the dimensioning of the bite valve components may not be feasible while maintaining structural integrity of the bite valve.

In view of the foregoing, there is a need in the art for an improved bite valve and hydration pack.

BRIEF SUMMARY

In accordance with one embodiment, there is provided a bite valve for controlling fluid flow from a fluid source. The bite valve includes a deformable sleeve including an outlet end and an opposite end, a sleeve outer surface and an opposing sleeve inner surface, and an outlet lip disposed between the sleeve outer surface and the sleeve inner surface at the outlet end. The bite valve further includes a hollow valve core received within the deformable sleeve. The valve core includes a core body including a distal end and an opposing inlet end. The valve core further includes an inlet disposed at the inlet end and coupleable to receive fluid flow from the fluid source. The inlet defines a flow channel along a longitudinal axis. The valve core further includes a core central chamber disposed between the distal end and the inlet end. The flow channel extends to the central chamber. The valve core further includes an annular chamber formed about the core body within the sleeve inner surface. The valve core further includes flow ports disposed radially about the core body in fluid communication with core central chamber and the annular chamber. The valve core further includes an outer rim disposed at the distal end adjacent the annular chamber. The outer rim is cooperatively sized and configured with the outlet lip with the outer rim being normally in sealing engagement with the outlet lip and with the outer rim out of sealing engagement with the outlet lip when the sleeve deformed towards the core body adjacent the annular chamber for discharging fluid flow from the bite valve about the outer rim between the outer rim and the outlet lip. It is contemplated that the bite valve features a hollow core design with the inclusion of the core central chamber that facilitates fluid flow outward through the flow ports. Such a configuration allows the valve core to not impede fluid flow from the fluid source to the overall bite valve, and fluid flow though the valve core is not restricted in comparison to fluid flow into the inlet. This is configuration allows for the bite valve to be reduced in sizing along with the fluid tube with respect to other bite valve designs while avoiding the bite valve from being overly restrictive with regard to fluid flow.

According to various embodiments, the outlet lip may be curved inward towards the core body. The outlet lip may include a sealing surface angled facing in a direction towards the distal end. The sealing surface may be angled facing in a direction towards the inlet end. The outer rim may include a seating surface angled facing in a direction away from the distal end. The seating surface may be angled facing in a direction away from the inlet end. A cross-sectional area of the flow channel at the inlet end with respect to fluid flow through the inlet may be less than the combined cross-sectional area of the flow ports with respect to fluid flow through the respective flow ports. In an embodiment, there are four flow ports.

According to another embodiment, there is provided a hydration pack. The hydration pack includes a fluid reservoir, a fluid tube and a bite valve. The fluid reservoir is sized and configured to contain an amount of fluid. The fluid tube has a reservoir end and an opposing valve end. The reservoir end is in fluid communication with the fluid reservoir for facilitating fluid flow from the fluid reservoir through the reservoir end to the valve end. The bite valve is for controlling fluid flow from the fluid reservoir from the fluid tube. The bite valve includes a deformable sleeve and a hollow valve core. The deformable sleeve includes an outlet end and an opposite end, a sleeve outer surface and an opposing sleeve inner surface, and an outlet lip disposed between the sleeve outer surface and the sleeve inner surface at the outlet end. The hollow valve core is received within the deformable sleeve. The valve core includes core body including a distal end and an opposing inlet end. The valve core further includes an inlet disposed at the inlet end and coupled to the valve end of the fluid tube to receive fluid flow from the reservoir. The inlet defines a flow channel along a longitudinal axis. The valve core further includes a core central chamber disposed between the distal end and the inlet end. The flow channel extends to the central chamber. The valve core further includes an annular chamber formed about the core body within the sleeve inner surface. The valve core further includes flow ports disposed radially about the core body in fluid communication with core central chamber and the annular chamber. The valve core further includes an outer rim disposed at the distal end adjacent the annular chamber. The outer rim is cooperatively sized and configured with the outlet lip with the outer rim being normally in sealing engagement with the outlet lip and with the outer rim out of sealing engagement with the outlet lip when the sleeve deformed towards the core body adjacent the annular chamber for discharging fluid flow from the bite valve about the outer rim between the outer rim and the outlet lip.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a cross-sectional view of the bite valve of FIG. 3 along axis 4-4 of FIG. 3;

FIG. 5 is a cross-sectional view of the bite valve with the fluid tube (as depicted in dashed lining);

FIG. 6 is a cross-sectional view of the bite valve along axis 6-6 of FIG. 5;

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
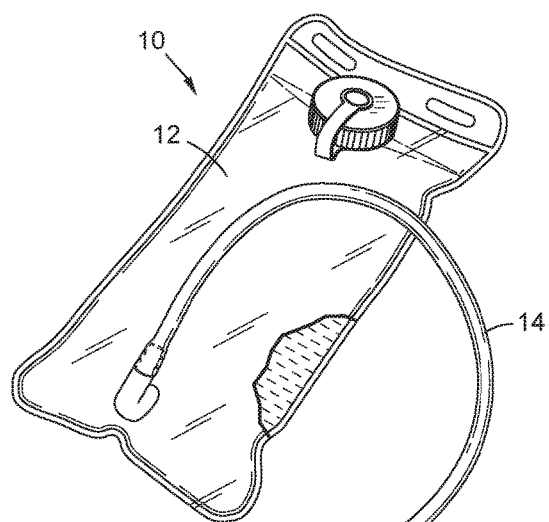
FIG. 1 is a perspective view of a hydration pack including a fluid reservoir, a fluid tube and a bite valve according to an embodiment of the invention.
Figure 2:
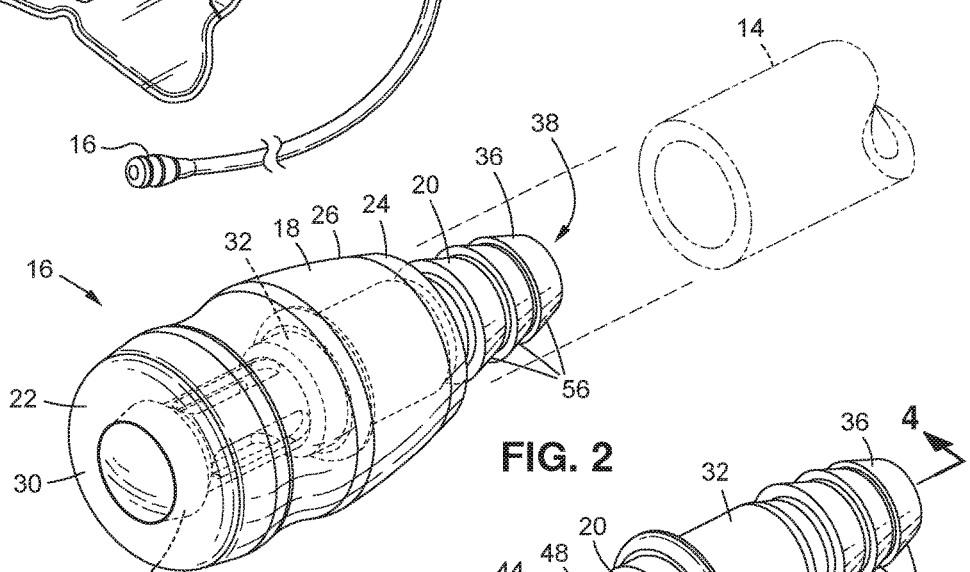
FIG. 2 is an enlarged perspective view of the bite valve with a portion of the fluid tube exploded from the bite valve (as depicted in dashed lining)
Figure 3:
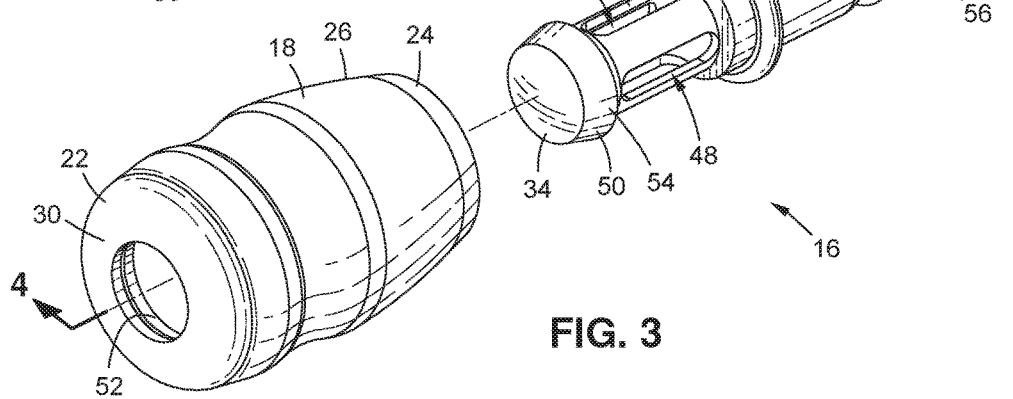
FIG. 3 is an enlarged perspective view of the bite valve with a deformable sleeve exploded from a hollow valve core.

Referring now to FIG. 1 there is depicted a perspective view of a hydration pack 10 including a fluid reservoir 12, a fluid tube 14 and a bite valve 16 according to an embodiment of the invention. FIG. 2 is an enlarged perspective view of the bite valve 16 with a portion of the fluid tube 14 exploded from the bite valve 16 (as depicted in dashed lining). FIG. 3 is an enlarged perspective view of the bite valve 16 with a deformable sleeve 18 exploded from a hollow valve core 20. FIG. 4 is a cross-sectional view of the bite valve 16 of FIG. 3 along axis 4-4 of FIG. 3. FIG. 5 is a cross-sectional view of the bite valve 16 with the fluid tube 14 (as depicted in dashed lining). FIG. 6 is a cross-sectional view of the bite valve 16 along axis 6-6 of FIG. 5.

In accordance with one embodiment, there is provided the bite valve 16 for controlling fluid flow from a fluid source, such as the fluid reservoir 12. The bite valve 16 includes the deformable sleeve 18. The deformable sleeve 18 includes an outlet end 22 and an opposite end 24, a sleeve outer surface 26 and an opposing sleeve inner surface 28, and an outlet lip 30 disposed between the sleeve outer surface 26 and the sleeve inner surface 28 at the outlet end 22. The bite valve 16 further includes a hollow valve core 20 received within the deformable sleeve 18. The valve core 20 includes a core body 32 including a distal end 34 and an opposing inlet end 36. The valve core 20 further includes an inlet 38 disposed at the inlet end 36 and coupleable to receive fluid flow from the fluid reservoir 12. The inlet 38 defines a flow channel 40 along a longitudinal axis 42. The valve core 20 further includes a core central chamber 44 disposed between the distal end 34 and the inlet end 36. The flow channel 40 extends to the central chamber 44. The valve core 20 further includes an annular chamber 46 formed about the core body 32 within the sleeve inner surface 28. The valve core 20 further includes flow ports 48 disposed radially about the core body 32 in fluid communication with core central chamber 44 and the annular chamber 46. The valve core 20 further includes an outer rim 50 disposed at the distal end 34 adjacent the annular chamber 46. The outer rim 50 is cooperatively sized and configured with the outlet lip 30 with the outer rim 50 being normally in sealing engagement with the outlet lip 30 and with the outer rim 50 out of sealing engagement with the outlet lip 30 when the sleeve deformed towards the core body 32 adjacent the annular chamber 46 for discharging fluid flow from the bite valve 16 about the outer rim 50 between the outer rim 50 and the outlet lip 30.

It is contemplated that the bite valve 16 features a hollow core design with the inclusion of the core central chamber 44 that facilitates fluid flow outward through the flow ports 48. Such a configuration allows the valve core 20 to not impede fluid flow from the fluid source to the overall bite valve 16, and fluid flow though the valve core 20 is not restricted in comparison to fluid flow into the inlet 38. This is configuration allows for the bite valve 16 to be reduced in sizing along with the fluid tube 14 with respect to other bite valve designs while avoiding the bite valve 16 from being overly restrictive with regard to fluid flow.

FIG. 4 includes directional arrows indicating direction of fluid flow during use. In this regard, fluid flow is intended to flow through the inlet 38 along the flow channel 40 to the core central chamber 40. Fluid flow may continue from the core central chamber 40 radially outward through the flow ports 48. In this embodiment, there are four such flow ports 48. It is contemplated that more or less flow ports may be implemented.

In this embodiment, a cross-sectional area of the flow channel 40 at the inlet end 36 with respect to fluid flow through the inlet 38 may be less than combined cross-sectional area of the flow ports 48 with respect to fluid flow through the respective flow ports 48. Further in this embodiment, the cross-sectional area of the flow channel 40 is the same as the at the inlet 30 with respect to fluid flow, and likewise the cross-sectional area of the flow channel 40 is the same as the core central chamber 44. In this regard, in this embodiment, fluid flow through the valve core 20 configured to be minimally restrictive. However, it is contemplated that the various sizing of the flow passages may vary by size, shape, volume, inner and outer diameters, wall thickness and so forth as desired while maintaining the structural integrity of the valve core 20.

Figure 7:
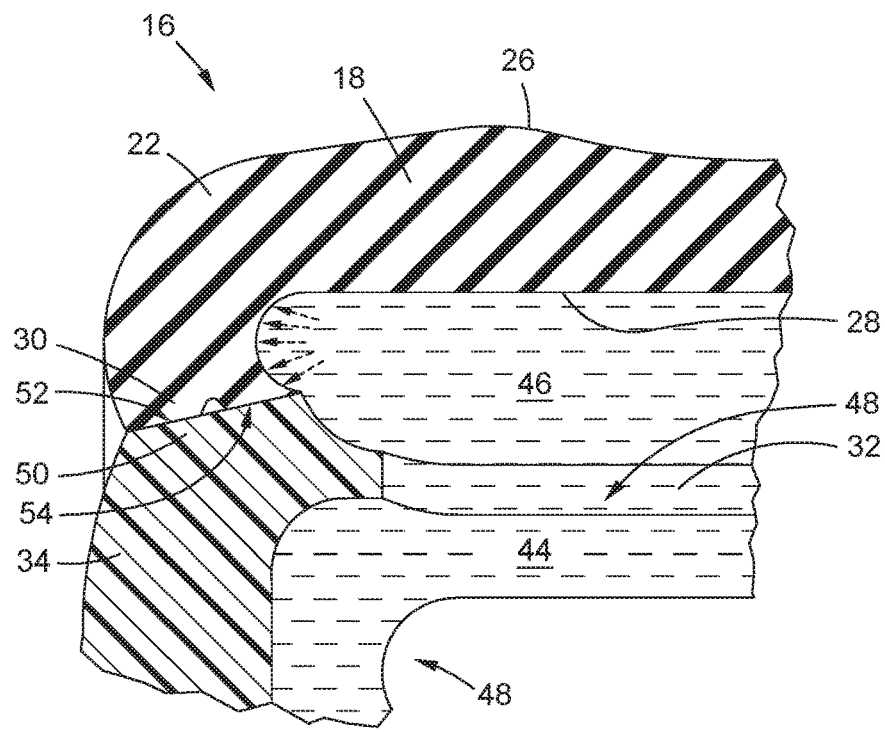
FIG. 7 is an enlarged view of a portion of the bite valve about location 7-7 of FIG. 5.
Figure 8:
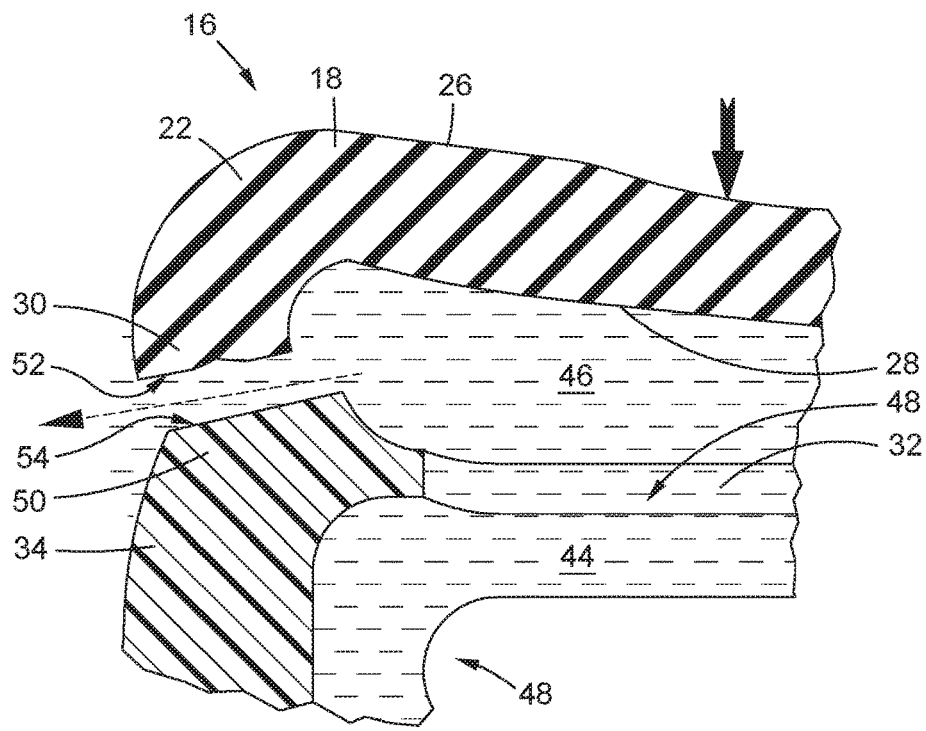
FIG. 8 is an enlarged view of a portion of the bite valve similar to that depicted in FIG. 7, however with the deformable sleeve flexed to allow fluid flow from the bite valve.

Referring additionally to FIG. 7 there is depicted an enlarged view of a portion of the bite valve 16 about location 7-7 of FIG. 5. FIG. 8 depicts the enlarged view of a portion of the bite valve 16 similar to that depicted in FIG. 7, however with the deformable sleeve 18 flexed to allow fluid flow from the bite valve 16.

According to various embodiments, the outlet lip 30 may be curved inward towards the core body 32. The outlet lip 30 may include a sealing surface 52 angled facing in a direction towards the distal end 34. The sealing surface 52 may be angled facing in a direction towards the inlet end 36. The outer rim 50 may include a seating surface 54 angled facing in a direction away from the distal end 34. The seating surface 54 may be angled facing in a direction away from the inlet end 36. As such, the outlet lip 30 is configured to naturally resist fluid flow or leakage at the outlet lip 30/outer rim 50 interface with the outlet lip 30 being slightly biased in a direction against the fluid flow direction from the bite valve 16. In order to allow fluid flow, the outlet lip 30 must deform to uncurl outward in a direction away from the valve core 20. However, the slight angulation impedes such uncurling and requires a more pronounced deformation than if there were no angulation (i.e., the seating surface 54 and the sealing surface 56 being parallel to the longitudinal axis 42). This facilitates maintaining sealed engagement. Additionally, the sleeve inner surface 28 at the outlet lip 30 may be curved so as to more evenly distribute fluid pressure.

As mentioned above, the outer rim 50 of the valve core 20 is cooperatively sized and configured with the outlet lip 30 of the deformable sleeve 18. The deformable sleeve 18 is configured to be normally in sealing engagement with the outlet lip 30 such as depicted in FIG. 7. The outlet lip 30 is disposed against the outer rim 50. The core body 32, including its outlet lip 30, is relatively more rigid compared to the deformable sleeve 18, including the outlet lip 30. As used herein the term "normally" connotes the resting position of the outlet lip 30 as being disposed against the outer rim 50 with the deformable sleeve 18 in its intended assembled condition with the valve core 20. As used herein "sealing engagement" refers to the outlet lip 30 being disposed against the outer rim 50 to generally form a fluid seal about the outer rim 50 with regard to mitigating fluid flow through the interface of the outer rim 50 and outlet lip 30 from within the bite valve 16. The diameter of the outer rim 50 may be formed slightly larger than the inner diameter of the outlet lip 30 when the deformable sleeve 18 is not in any deformed state, such as at rest and not assembled with the valve core 20. With such a sizing, upon receiving the valve core 20 within the deformable sleeve 18, the outlet lip 30 would elastomerically stretch and being in tension and thus facilitate a snug fit to enhance the sealing engagement with the outer rim 50.

In assembling the hydration pack 10, the deformable sleeve 18 is pulled over the valve core 20 with the sealing surface 52 disposed about the seating surfaced 54 to first assemble the bite valve 16. The bite valve 16 is connected to the fluid tube 14. The core body 32 may include ridges 56 at the inlet end 36. The ridges 56 may have a maximum diameter slightly greater than the inner diameter of the fluid tube 14. The fluid tube 14 is fitted about the inlet end 36 of the valve core 20 and may be required to be deformed slightly thereby facilitating a snug fit for sealed engagement. The other end of the fluid tube 14 is connected to the fluid source in the form of the fluid reservoir 12. The fluid reservoir 12 may be fitted within a backpack or otherwise worn by the user. The bite valve 16 may be positioned adjacent the user's mouth. For example, the fluid tube 14 may be tethered or clipped to the user's clothing or backpack strap along the fluid tube 14 near the bite valve 16 in close proximity to the user's mouth.

During use, the user would slightly bite upon sleeve outer surface 26 of the deformable sleeve 18 adjacent the annular chamber 46. This would cause the deformable sleeve 18 to deform inward into the annular chamber 46. Such deformation is contemplated to breach the sealing engagement of the outlet lip 30 with the outer rim 50. While causing such deformation, the user would also apply a negative pressure to the distal end 30 and the outlet end 22 through slight sucking. This would draw fluid flow from the fluid reservoir 12, the fluid tube 14, the inlet 38, the flow channel 40, the core central chamber 44, the flow ports 48, the annular chamber 46 and between the outlet lip 30 and the outer rim 50 for deliver to the user's mouth.

The deformable sleeve 18 is contemplated to be formed of an elastomeric material, such as a silicon rubber material. The material requirements would contemplate that the material be formed to be flexible to allow for the outlet lip 30 to be flexed upon the sleeve 18 being deformed during use while being elastomeric to facilitate the outlet lip 30 to be able to maintain a sealed engagement with the outer rim 50 after a multitude of flexures/usages. The hollow valve core 20 is contemplated to be formed of a rigid material, such as a plastic material. Also, the deformable sleeve 18 and valve core 20 are sized and configured to have sufficient toughness and structural integrity to withstand reasonably anticipated forces applied to it, such are during use, including being repetitively bitten. The deformable sleeve 18 and valve core 20 in this embodiment are of each unitary construction of a single material. However, it is contemplated that the deformable sleeve 18 and valve core 20 may be each formed of more than one component and of differing materials. The deformable sleeve 18 and valve core 20 may be formed according to those methods and of those materials which are well known to one of ordinary skill in the art.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A bite valve for controlling fluid flow from a fluid source, the bite valve comprising:
 a deformable sleeve including an outlet end and an opposite end, a sleeve outer surface and an opposing sleeve inner surface, and an outlet lip disposed between the sleeve outer surface and the sleeve inner surface at the outlet end, the sleeve defining a longitudinal axis; and
 a hollow valve core received within the deformable sleeve, the valve core being disposed in fixed relation to the deformable sleeve along the longitudinal axis, the valve core including:
  a core body including a distal end and an opposing inlet end;
  an inlet disposed at the inlet end and coupleable to receive fluid flow from the fluid source, the inlet defining a flow channel along the longitudinal axis;
  a core central chamber disposed between the distal end and the inlet end and along the longitudinal axis, the flow channel extending to the core central chamber;
  an annular chamber formed about the core body within the sleeve inner surface;

flow ports disposed radially about the core body in fluid communication with the core central chamber and the annular chamber; and an outer rim disposed at the distal end with the core central chamber extending all the way to the outer rim along the longitudinal axis, the outer rim having a diameter greater than a diameter of the hollow valve core at the flow ports, the outer rim being cooperatively sized and configured with the outlet lip with the outer rim being normally in sealing engagement with the outlet lip and when the sleeve being deformed towards the core body adjacent the annular chamber the outer rim being out of sealing engagement with the outlet lip for discharging fluid flow from the bite valve about the outer rim between the outer rim and the outlet lip.

2. The bite valve of claim 1 wherein the outlet lip is curved inward towards the core body.

3. The bite valve of claim 1 wherein the outlet lip includes a sealing surface angled facing in a direction away from the distal end.

4. The bite valve of claim 3 wherein the sealing surface is angled facing in a direction towards the inlet end.

5. The bite valve of claim 1 wherein the outer rim includes a seating surface.

6. The bite valve of claim 5 wherein the seating surface is angled facing in a direction away from the inlet end.

7. The bite valve of claim 1 wherein a cross-sectional area of the flow channel at the inlet end with respect to fluid flow through the inlet is less than combined cross-sectional area of the flow ports with respect to fluid flow through the respective flow ports.

8. The bite valve of claim 1 wherein there are four flow ports.

9. A hydration pack comprising:
a fluid reservoir sized and configured to contain an amount of fluid;
a fluid tube having a reservoir end and an opposing valve end, the reservoir end in fluid communication with the fluid reservoir for facilitating fluid flow from the fluid reservoir through the reservoir end to the valve end;
a bite valve for controlling fluid flow from the fluid reservoir from the fluid tube, the bite valve comprising:
a deformable sleeve including an outlet end and an opposite end, a sleeve outer surface and an opposing sleeve inner surface, and an outlet lip disposed between the sleeve outer surface and the sleeve inner surface at the outlet end, the sleeve defining a longitudinal axis; and
a hollow valve core received within the deformable sleeve, the valve core being disposed in fixed relation to the deformable sleeve along the longitudinal axis, the valve core including:
a core body including a distal end and an opposing inlet end;
an inlet disposed at the inlet end and coupled to the valve end of the fluid tube to receive fluid flow from the reservoir, the inlet defining a flow channel along the longitudinal axis;
a core central chamber disposed between the distal end and the inlet end and along the longitudinal axis, the flow channel extending to the core central chamber;
an annular chamber formed about the core body within the sleeve inner surface;
flow ports disposed radially about the core body in fluid communication with the core central chamber and the annular chamber; and
an outer rim disposed at the distal end with the core central chamber extending all the way to the outer rim along the longitudinal axis, the outer rim having a diameter greater than a diameter of the hollow valve core at the flow ports, the outer rim being cooperatively sized and configured with the outlet lip with the outer rim being normally in sealing engagement with the outlet lip and when the sleeve being deformed towards the core body adjacent the annular chamber the outer rim being out of sealing engagement with the outlet lip for discharging fluid flow from the bite valve about the outer rim between the outer rim and the outlet lip.

10. The hydration pack of claim 9 wherein the outlet lip is curved inward towards the core body.

11. The hydration pack of claim 9 wherein the outlet lip includes a sealing surface angled facing in a direction away from the distal end.

12. The hydration pack of claim 11 wherein the sealing surface is angled facing in a direction towards the inlet end.

13. The hydration pack of claim 9 wherein the outer rim includes a seating surface.

14. The hydration pack of claim 13 wherein the seating surface is angled facing in a direction away from the inlet end.

15. The hydration pack of claim 9 wherein a cross-sectional area of the flow channel at the inlet end with respect to fluid flow through the inlet is less than combined cross-sectional area of the flow ports with respect to fluid flow through the respective flow ports.

16. The hydration pack of claim 9 wherein there are four flow ports.

* * * * *